E. J. FRANCK.
CIRCULAR FASHIONING KNITTING MACHINE.
APPLICATION FILED JAN. 22, 1908.
1,150,183.  Patented Aug. 17, 1915.
5 SHEETS—SHEET 1.
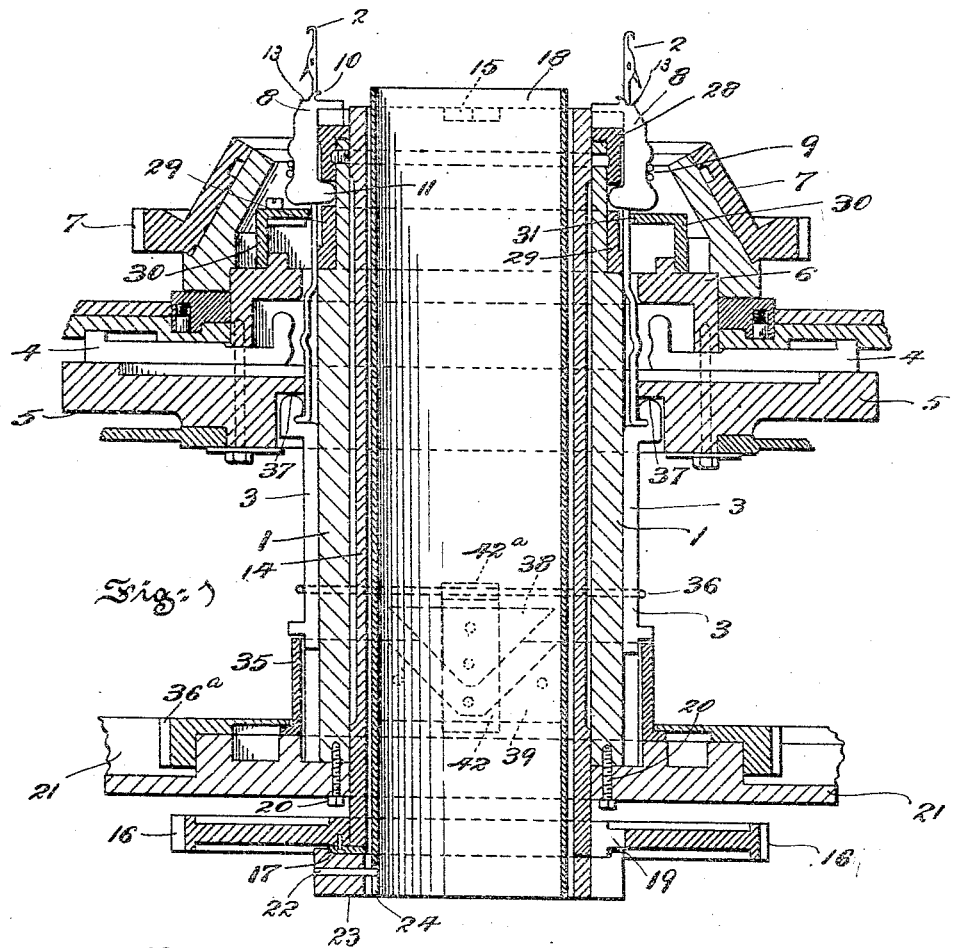
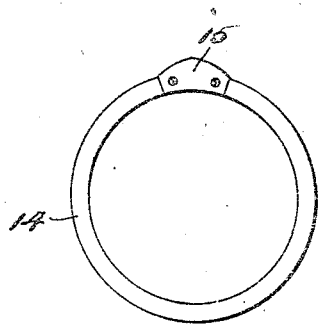
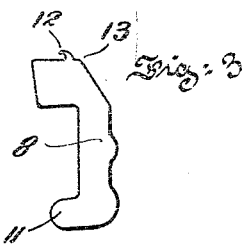
WITNESSES:
INVENTOR.
Emil J. Franck.
BY
ATTORNEYS

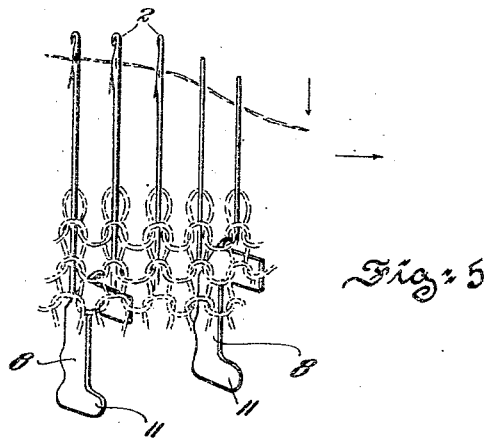
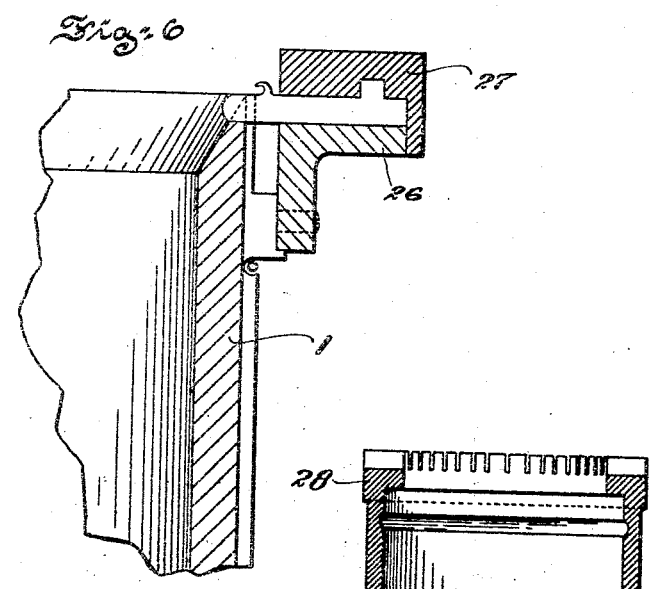
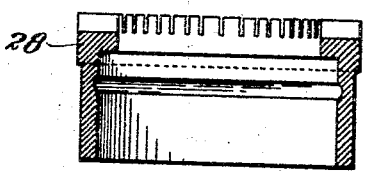

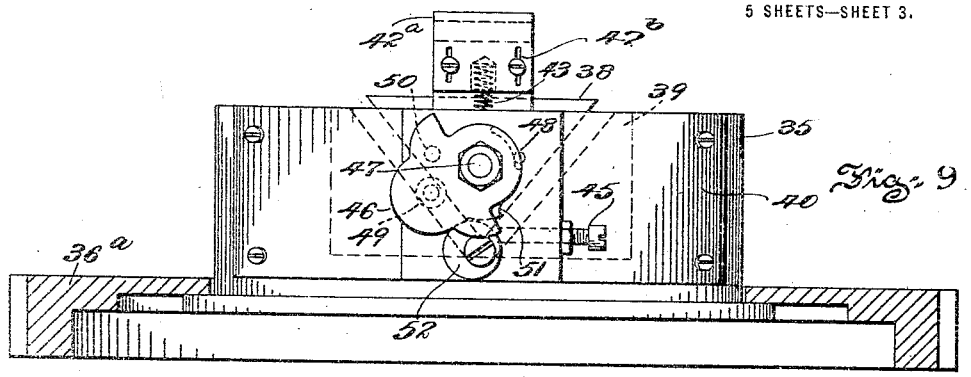
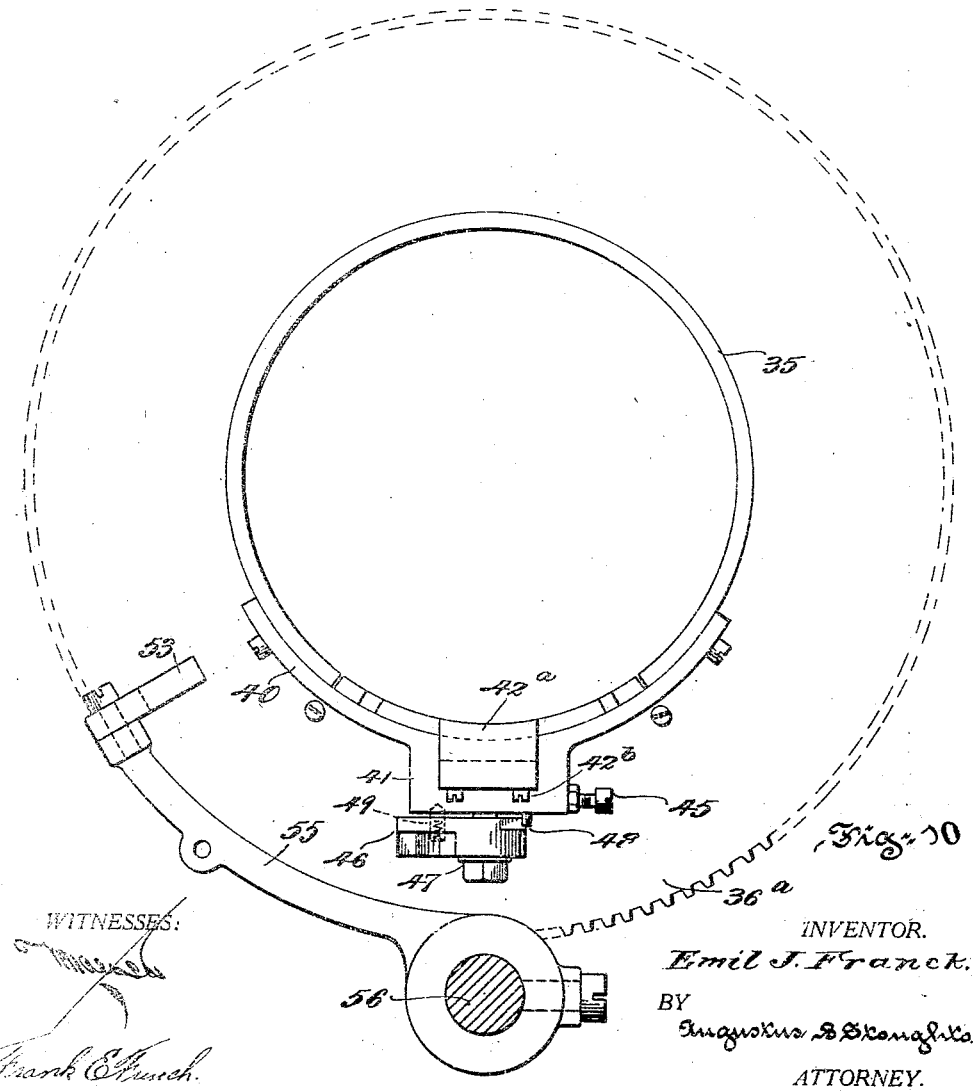

E. J. FRANCK.
CIRCULAR FASHIONING KNITTING MACHINE.
APPLICATION FILED JAN. 22, 1908.
1,150,183.
Patented Aug. 17, 1915.
5 SHEETS—SHEET 4.
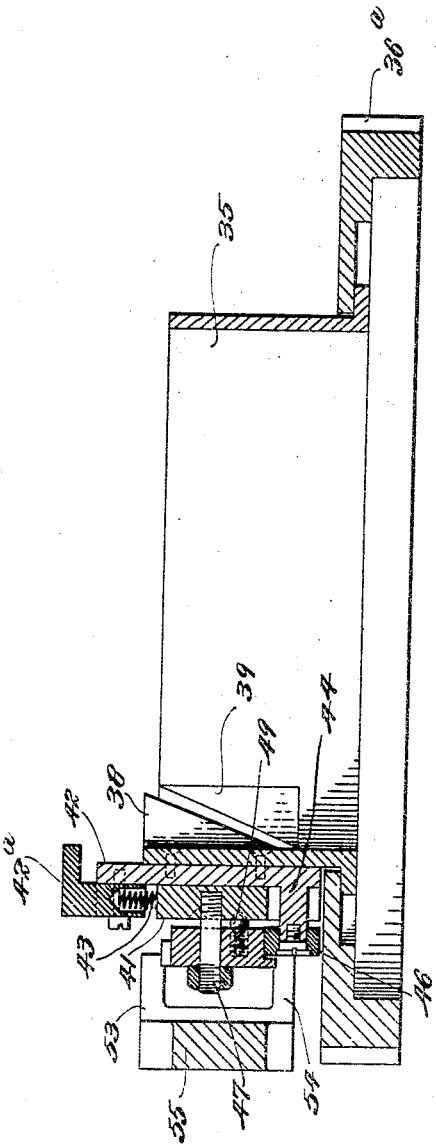
WITNESSES:
INVENTOR.
Emil J. Franck.
BY
ATTORNEY.

E. J. FRANCK.
CIRCULAR FASHIONING KNITTING MACHINE.
APPLICATION FILED JAN. 22, 1908.
1,150,183.
Patented Aug. 17, 1915.
5 SHEETS—SHEET 5.
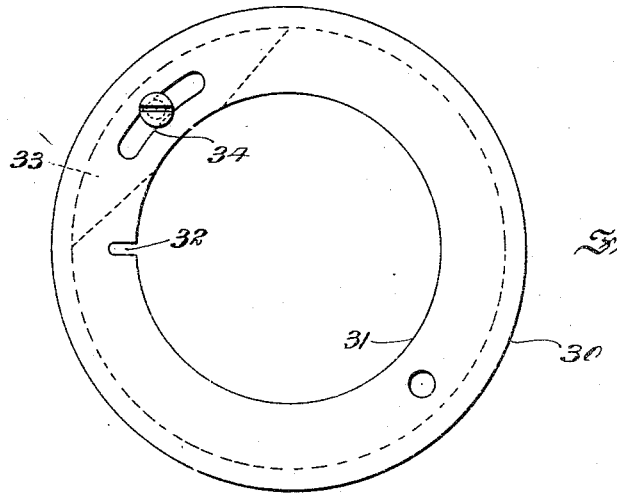
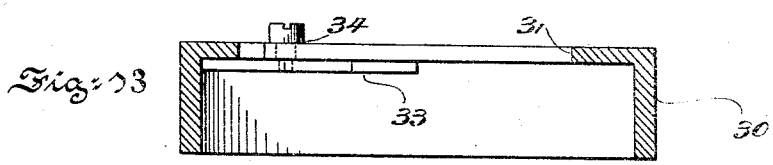
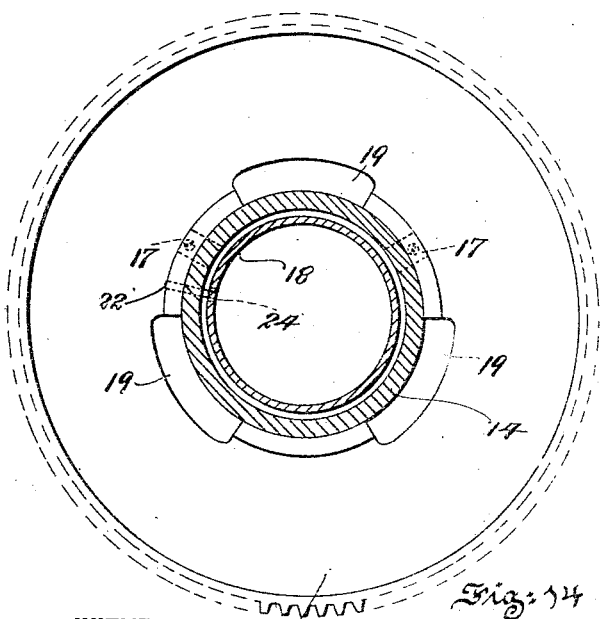
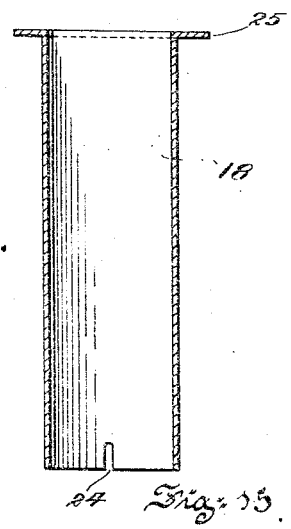
INVENTOR.
Emil J. Franck.
BY
Augustus D. Houghton.
ATTORNEY.
WITNESSES:

UNITED STATES PATENT OFFICE.

EMIL J. FRANCK, OF PHILADELPHIA, PENNSYLVANIA.

CIRCULAR-FASHIONING KNITTING-MACHINE.

1,150,183.
Specification of Letters Patent.
Patented Aug. 17, 1915.

Application filed January 22, 1908. Serial No. 412,121.

*To all whom it may concern:*

Be it known that I, EMIL J. FRANCK, a citizen of the United States, and resident of Philadelphia, in the county of Philadelphia and State of Pennsylvania, have invented certain new and useful Improvements in Circular-Fashioning Knitting-Machines, of which the following is a specification.

The present improvements are applicable not only for use in connection with any knitting machines to which they are adaptable, but also in connection with the knitting machine described in my patent numbered 991,711, of May 9th, 1911, and they may be said to relate to certain features of the machine which coöperate in the production of stitches.

Objects of the present invention are to feed the work down or pull loops over the needles in much the same manner as a weight attached to the work would do, that is by pulling instead of pushing not only the stitch wale but also the new thread; to improve the construction and operation of the web holders and to provide a guide for the work; to improve the construction and operation of the mechanism by which the needle cam is automatically raised and lowered, and to improve the construction and arrangement of the parts between which the needles slide and by which they are guided.

The improvements will now be described and finally claimed, and in connection with this description reference is made to the accompanying drawings, in which—

Figure 1, is a view principally in central section illustrating so much of a knitting machine as is necessary in order to illustrate the application thereto of parts embodying the features of the invention. Figs. 2 and 3, are views drawn to an enlarged scale and illustrating, Fig. 2, web holders and also, Fig. 3, a modification thereof. Fig. 4, is a top or plan view of the cam by which the web holders are operated. Fig. 5, is a diagrammatic view looking from the inside of the cylinder and showing how the web holders engage the stitch wales in pulling the loops off the needles. Fig. 6, is a view illustrating the web holder mechanism and embodying a modification of the invention. Fig. 7 is a side view showing a web holder adapted for use in connection with the arrangement shown in Fig. 6. Fig. 8, is a view of the top of the needle cylinder showing a protruding ring or surface at the top thereof upon which the needles slide and intended for use with web-holders like those shown in Fig. 7. Figs. 9, 10, and 11, are an elevation, plan and section showing means for operating the main needle cam. Figs. 12 and 13, are respectively a plan and a section of the needle holding ring. Fig. 14, is a plan partly in section of the needle cylinder and other cylinders that are arranged concentrically with it, and Fig. 15, is a sectional view illustrating a modification of the work guide cylinder.

In the drawings 1, is the fixed needle cylinder axially grooved on its outside. Within each of the grooves is arranged a needle 2, and a jack 3, which are detachably hooked together so as to be capable of operating as one piece and also capable of being disconnected so that the needle will, when required, remain out of action. There are pressers 4 operated by suitable mechanism not shown nor claimed herein, which serve to press the needles 2, clear of the jacks 3, for example, during fashioning. Presser operating mechanism suitable for the purpose is shown in my application 322,150. These pressers 4, work in slots in a bed 5, and this bed is carried by a ring 6, shrunk onto the needle cylinder. The ring 6, also supports a gear wheel 7, which carries a cam that actuates certain parts fully described in my application to which reference has been made and which need not be described in this application, because they are not to be claimed herein.

The web holders 8, are arranged between the needles at the top of the needle cylinder and they are held to place by encircling spring or elastic bands 9. Each web holder has a hook 10 and is adapted to be turned about its tail piece 11. When the hook 12, is positioned as shown in Fig. 3, the loops are formed at the part marked 13.

Within the needle cylinder 1, there is a rotatable cylinder 14, provided with a cam 15. This rotatable cylinder is provided with a gear wheel 16, by means of which it is driven. As shown the gear wheel 16, is provided with inwardly extending legs or plates 17 (Fig. 14) upon which the cylinder 14, is supported and these legs or plates 17, take into notches in the bottom of the cylinder 14, so that the parts are readily detachable, yet rotate together.

Within the rotating cylinder 14, there is a fixed cylinder 18, through which the work passes and which constitutes a guide for it. The gear wheel 16, is shown as provided with openings 19, through which access may be had to the screws 20, by means of which the main cylinder is held to place on the bed 21. The cylinder 18, is shown as supported by pins 22, projecting inward from a fixed portion of the bed 23 and the ends of these pins 22, take into notches 24 (Fig. 15). The purpose of this construction is to afford ease in assembling the machine and taking it apart. As shown in Fig. 1, the top of the cylinder 18, is straight, but as shown in Fig. 15, it is flanged as at 25, and this flange when present serves to form the cover for the upper ends of the other two cylinders 14 and 1.

In the operation of the machine the elastic or spring bands 9 tend to draw the hooks or sinkers inward toward the center of the cylinder, but the revolution of the cam 15, pushes some of them outward and then after its passage permits them to return to their innermost position under the influence of the elastic bands 9. The needles 2, which are of the latch variety receive the thread into their hooks and then descend so as to throw off a loop. The movement and design of the cam 15, is such that before the needle descends and while the thread is well in the air, the web holder is drawn back and released, so that its hook 10, takes into the wale loop well below the thread. This is illustrated at the right in Fig. 5. Then after the needle has descended and throws off its loop the hook of the web holder engages the second wale loop from the needle. This is shown at the left in Fig. 5, it being understood that in Fig. 5, intermediate web holders are omitted. Since the web holder hook engages the stitch wale well beneath the thread, it follows that in widening and narrowing there is an advantage in that the thread does not become caught by the hooks of the web holders. Furthermore the described action of the web holders since they engage the second stitch wale from the needle is that of pulling the work in much the same way that a weight attached to it would do.

As shown in Fig. 6, the web holders are slidably mounted in radial grooves in a bed 26, secured to the needle cylinder and they are operated by a cam 27, which is revolved for the purpose. The web holders are against the fabric before a new loop is drawn down.

At the top of the fixed needle cylinder in the form shown in Fig. 1 there are two rings 28 and 29. They are suitably secured to it above the needle grooves and the top ring 28 is notched at its top to make grooves for the sinkers. Each of these rings has a high part and a low part and the high parts afford surfaces upon which the needles should slide, while the low parts constitute a depression between the high parts so that the needles can spring a little and will not jam. Furthermore the high parts of these rings on which the needles slide may be readily made true and as has been stated even if they are not quite true the needles can spring a little and thus accommodate themselves so as to work properly, freely and easily.

30, is a ring supported by the part 6, and its inner edge 31 serves to retain the needles in place in respect to the high parts of the rings 28 and 29. Thus the needles work between three separated points, namely, the high parts of the rings 28 and 29 and the inner rim 31 of the ring 30.

Referring to Fig. 12, the ring 30, is radially notched as at 32 and this ring 30 can be turned so as to bring the notch 32 opposite any needle which is to be removed and a new needle may be inserted through this notch 32. The lower flange of the ring 30 has a running fit on a suitable seat on the ring 6. Beneath the top flange of the ring 30, there is a movable plate 33, which is connected with it by a slot and screw connection 34; so that the plate 33 can be moved to cover and uncover the notch 32. The ends of this movable plate 33 are beveled so as not to jam in respect to the needles which are to be passed through the notch 32.

35, is a cam ring that operates the jacks 3. Their butts ride upon it as shown in Fig. 1 and they are held to place on the cylinder by means of an elastic or spring band 36. The plate 37 serves to limit the upward motion of the jacks. The cam 35 is provided with the usual V-shaped part or stitch cam 38, which is usually hardened. The parts or lifting cams 39, which are the complements of the part 38, are also hardened and they are detachably connected with the cam ring 35. The cam ring 35 is driven by the gear wheel 36$^a$ and is revolubly mounted on a seat formed on the bed 21. The cam ring is cut away where the parts 38 and 39 are arranged, but is closed by a plate 40 (Fig. 10) which at its center is somewhat yoke shaped and this plate 40 is detachably connected to the cam ring 35 so that it can be removed in order to afford access to the parts 38 and 39, which frequently require grinding, renewal or other adjustment. Within the yoke shaped portion 41 of the plate 40 there is arranged a movable block 42 to which the V-shaped portion or stitch cam 38 is attached. Between the top of the movable block 42 and the fixed part 41 there is a spring 43 which tends to push the movable block 42$^a$ adjustably attached to the block 42 upward. The block 42 is provided with a stud 44 that extends through and is movable up and down in a slot formed in the part 41. This slot is shown in Fig. 11, but in Fig. 9, is covered by the part 52. The natural tendency of the spring 43 is to act upon the movable block 42 in respect to the fixed part 41 and push it together with the cam 38 and stud 44 upward. However, the point of the adjusting screw 45, mounted in the fixed yoke 41, may be made to overlie the stud 44 and thus limit its upward range of motion. The point of this screw is tapering, or in other words, truly pointed, and thus by screwing it in or out, it is possible to effect a very accurate adjustment of the upward limit of the travel of the cam. The cam 38 is raised and lowered so as to make respectively shorter and longer stitches. There is a double arm tappet lever 46 pivoted at 47 to the fixed part 41. The pin and notch 48 limit the range of travel of this tappet lever and the spring pin 49 and cavities 50 (the pin is in one) serve to hold it in its extreme positions. This double arm tappet lever is provided with a cam face 51 shown partly in dotted lines in Fig. 9 which serves to engage an eccentric 52 fast on the stud 44, so that when the tappet arm is in one position shown in Fig. 9 the stud 44, is in depressed position and when it is in the other position with its pin 49, in engagement with the upper cavity 50, shown in Fig. 9, the stud 44, is in elevated position. The eccentric 52, may be turned in respect to the stud 44, and then secured to place as by a screw whereby there is afforded an adjustment between the cam face 51 and the stud 44.

53 and 54, are the arms of a tappet arm 55. The tappet arm 55, is mounted on a vertically movable rod 56, the movements of which are controlled from any appropriate moving part of the machine. When this rod is in its lowest position the part 53 strikes the upper arm of the tappet lever 46 and thus turns the tappet lever 46; in consequence of which the part 38 of the cam is drawn down and when the rod 56 is in the highest position the part 54 strikes the other arm of the tappet lever and turns it into such position that the cam 38 is allowed to rise by the action of the surface 51 on the part 52. The top member 42ª is secured to the movable piece 42, by slot and screw connections 42ᵇ and it overhangs inward so as to overlie the butts of the jacks and serve to prevent them from rising too far. The slot and screw connection 42ᵇ constitutes a means of adjustment. The spring 43 as has been said bears upon the overhanging underface of the top part 42ª.

By reference to the drawings, more particularly to Figs. 2, 3, 6 and 7, it will be observed that the shank of the hook on the web holder is substantially the same width as the stem of the needle and that there is space in rear or outside of the hook, whereby room is provided for the formation of the stitches.

What I claim is:

1. The combination in a knitting machine of a circle of needles, a thread guide, web-holders having hooks, and means for operating and timing the relative movement of said parts and for placing the entire hook inside of the circle of needles to form the new loops outside of the hooks while the old loops are inside of the hooks whereby said web-holders have a web take-up action.

2. The combination of a needle cylinder provided around the outside of its top with a circular row of web-holders having their operative ends arranged inward, a revoluble cylinder arranged in the needle cylinder and inside the row of web-holders and provided at its top with a cam for working the web-holders, and a stationary cylinder inside of the revoluble cylinder and through which the work passes, substantially as described.

3. In a knitting machine the combination of a needle cylinder provided around its top with web-holders having their free ends arranged toward the axis of the cylinder, a revoluble cylinder arranged inside of the needle cylinder and provided at its top with a cam operating upon said free ends of the web-holders, and a stationary cylinder inside of the revoluble cylinder, substantially as described.

4. In combination in a knitting machine needles, web-holders projecting radially outside said needles and having hooks the shank of which extend above the tops of the holders and having in rear of the shanks portions disposed outside of the needles and at which the loops are formed, and means for operating the web-holders and needles to form loops at said portions and outside of the needles.

5. In combination in a knitting machine a circle of needles, web-holders extending outside of the circle of needles and having hooks the shanks of which extend above the tops of the holders and which are cut away immediately in rear of the hooks and outside of the circle of needles to provide spaces in which loops are formed, and means for operating the web-holders and needles to form loops in rear of the points of the hooks and outside of the circle of needles.

In testimony whereof I have hereunto signed my name.

EMIL J. FRANCK.

Witnesses:
W. J. JACKSON,
FRANK E. FRENCH.